United States Patent [19]

Shimoda

[11] Patent Number: 4,769,653

[45] Date of Patent: Sep. 6, 1988

[54] MULTIHEAD LIQUID EMISSION RECORDING APPARATUS

[75] Inventor: Junji Shimoda, Sagamihara, Japan

[73] Assignee: Canon Kabushiki Kaisha, Tokyo, Japan

[21] Appl. No.: 4,258

[22] Filed: Jan. 2, 1987

Related U.S. Application Data

[63] Continuation of Ser. No. 677,489, Dec. 3, 1984, abandoned.

[30] Foreign Application Priority Data

Dec. 9, 1983 [JP] Japan ................................ 55-232537

[51] Int. Cl.[4] ................................ G01D 15/16

[52] U.S. Cl. ................................ 346/140 R

[58] Field of Search ................................ 346/140

[56] References Cited

U.S. PATENT DOCUMENTS

| | | | |
|---|---|---|---|
| 4,189,734 | 2/1980 | Kyser | 346/140 X |
| 4,300,144 | 11/1981 | Isayama | 346/140 |
| 4,329,698 | 5/1982 | Smith | 346/140 |
| 4,369,455 | 1/1983 | McConica | 346/140 |
| 4,521,786 | 6/1985 | Bain | 346/140 |
| 4,549,190 | 10/1985 | Ohara | 346/108 |

*Primary Examiner*—Joseph W. Hartary
*Attorney, Agent, or Firm*—Fitzpatrick, Cella, Harper & Scinto

[57] ABSTRACT

A multihead liquid emission recording apparatus comprises a plurality of liquid emission nozzles; a plurality of electromechanical conversion elements each provided for each of said plurality of liquid emission nozzles for jetting a recording liquid particle from each nozzle; and drive circuit means for driving each of said electromagnetic conversion elements by a voltage signal corresponding to its recording signal; wherein the change range of said drive signal for driving each of said electromagnetic conversion element is set such that the variation ranges of dot diameters on a recording medium formed by said recording liquid particle jetted out of each of said liquid emission nozzles become substantially the same.

10 Claims, 3 Drawing Sheets

MULTIHEAD LIQUID EMISSION RECORDING APPARATUS

This application is a continuation of application Ser. No. 677,489 filed Dec. 3, 1984, now abandoned.

BACKGROUND OF THE INVENTION

1. Field of the Invention

The present invention relates to a multihead liquid emission recording apparatus, and more particularly relates to a multihead liquid emission recording apparatus suitable for use with such a device as a color image printer.

2. Description of the Prior Art

In a multihead liquid emission recording apparatus, if there is a difference of liquid-jet characteristics among a plurality of liquid emission heads, it has been inevitable that the diameter of each recording dot on a recording paper formed by the respective heads becomes unequal even if the same drive voltage is used for driving the respective heads. In addition, in the case that a high fidelity image is intended to be obtained by changing the dot diameter by changing the drive voltage for the respective heads (so-called analog modulation), even if the respective heads are driven within the same drive voltage variation range, the above mentioned inequality of the dot diameters has been a great obstacle to high image fidelity. In other words, there arises a problem in the case of a color image printer, since the density variation range on a recording paper is different for each head, the quality of a reproduced color image is degraded, and furthermore, the color tone obtained by each head is different from each other.

In such an apparatus, in order to make the jet characteristics uniform throughout the respective heads composing a multihead, some measures have been adopted. One of the measures is to manufacture a high precision head by improving the dimensional accuracy of the components constituting the head, such as electromechanical conversion elements, nozzles, and the like. Another of the measures is to determine each jet characteristic of independent heads and select heads having relatively similar characteristics so as to fabricate therefrom an integrated multihead. However, both of such measures have been found unsatisfactory because they produce an inevitable rise in cost.

SUMMARY OF THE INVENTION

It is therefore a principal object of the present invention to provide a novel multihead liquid emission recording apparatus which can eliminate the above mentioned prior art disadvantages.

It is another object of the present invention to provide a multihead liquid emission recording apparatus which can eliminate the prior art disadvantages by incorporating an ingenious device into a drive circuit for each separate liquid emission head.

It is a further object of the present invention to provide a multihead liquid emission recording apparatus capable of providing a high fidelity image in which the above disadvantages associated with the conventional multihead type apparatus are eliminated, the recording density variation range on a recording medium of respective heads composing a multihead is made uniform in a simple manner and with a low cost, and the color of the recorded image is improved.

With these objects in view, according to an embodiment of one aspect of the present invention, the multihead liquid emission recording apparatus comprises: a plurality of liquid emission nozzles; a plurality of electromechanical conversion elements each provided for each of said plurality of liquid emission nozzles for jetting a recording liquid particle from each nozzles; and drive circuit means for driving each of said electromagnetic conversion elements by a voltage signal corresponding to its recording signal; and wherein the variation range of said drive signal for driving each of said electromagnetic conversion elements is set such that the variation range of each diameter on a recording medium formed by said recording liquid particle jetted out of each said liquid emission nozzles becomes substantially same.

In this caes, the drive circuit means may preferably include means for adjusting the variation range of said drive signal for driving each of said electromagnetic conversion elements in such a manner that the variation range of each diameter on a recording medium formed by said recording liquid particle jetted out of each of said liquid emission nozzles becomes substantially same with each other.

The drive signal is applied, for example, in a form of a drive voltage, to the electromagnetic conversion element (for instance, a piezo ceramic element).

The other objects and features of the present invention will become apparent from the following description of the embodiment when taken in connection with the accompanying drawings.

BRIEF DESCRIPTION OF THE DRAWINGS

The preferred embodiment according to the present invention will now be described with reference to the accompanying drawings, in which.

DETAILED DESCRIPTION OF THE EMBODIMENT

Figures 1A, 1B:
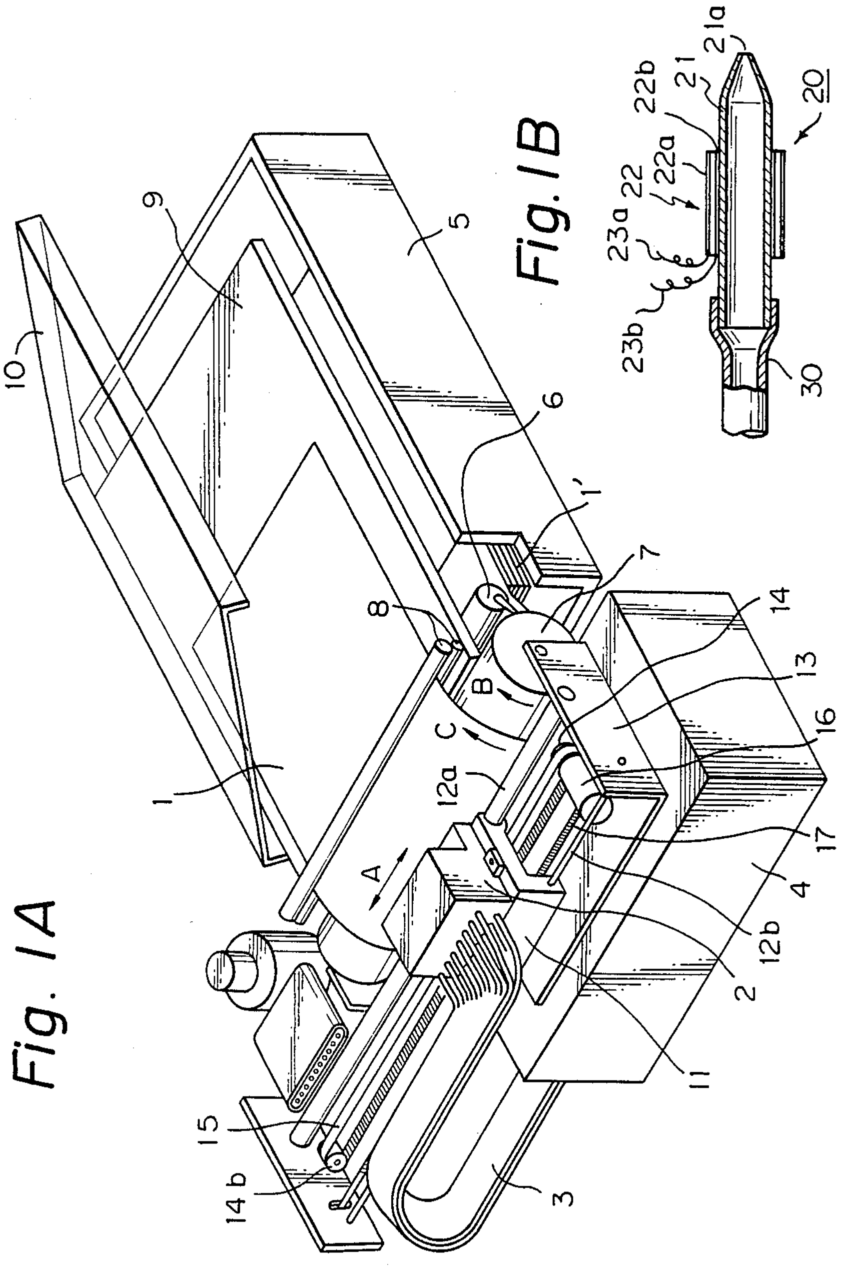
FIG. 1A is a perspective view of a recording mechanism of a multihead liquid emission recording apparatus according to an embodiment of the present invention.
FIG. 1B is a sectional view illustrating a structure of a single liquid emission recording head.

Referring now to FIG. 1, reference number 1A denotes a recording paper which is one example of a recording medium on which an image is recorded, reference number 2 denotes a recording head unit including a plurality of ink-jet heads, reference number 3 denotes an integrated body made of plural supply tubes through which recording liquid (ink) are supplied to respective ink-jet heads contained in the recording head unit 2, and reference number 4 denotes an ink reservoir connecting one end of the supply tube integration body 3 and including ink reservoir chambers corresponding to the respective heads. For instance, in the case of a color linear printer, ink of different colors are respectively stored in each of the ink reservoir chambers, and particular ink in each ink reservoir chamber is supplied through the corresponding supply tube to the corresponding head.

Each head 20 contained in the recording head unit 2 mainly comprises, as shown in FIG. 1B, a nozzle 21 formed with an orifice 21*a* at its tip for jetting out therethrough a flying liquid particle, and an electromagnetic conversion element 22 mounted surrounding a portion of the nozzle 21, such as piezo electric element (piezo ceramic element) serving as an energy generating means for forming the flying liquid particle. The nozzle 21 for each head 20 is coupled to a flexible supply tube 30 made of, for example, vinyl plastic, and the electrodes 22*a* and 22*b* of the electromagnetic conversion element 22 for each head 20 are respectively connected, through connection wires 23*a* and 23*b*, to a drive circuit supplying a drive voltage in correspondence with a signal to be recorded.

The nozzle 21 is made of, for example, a glass tube, and the electromagnetic conversion element 22 of a tublar shape is fixed with appropriate adhesive on and around an outer periphery of the nozzle 21. The tubular type electromagnetic conversion element 22 utilizing a piezoelectric element reduces its diameter, as already well known, by applying a drive voltage in the same direction as that of a polarizing voltage applied to the piezo ceramic element, and resumes its original shape by removing the drive voltage. Therefore, the pressure change in the nozzle 21 is brought about by the rapid reduction of the diameter of the electromagnetic conversion element 22 due to the application of a drive pulse and by the restoration to the original shape immediately thereafter. Thus, a single or more small ink particles are jetted out of the orifice 21*a*, and in this case, the amount of jetted ink may be varied by changing a voltage value of the drive voltage pulse.

Reverting back to FIG. 1, the recording paper 1A is accommodated within a cassette 5 in a form of a stack 1', and the uppermost sheet is pulled out with a paper feeder roller 6 to supply and roll it around a platen 7. The paper 1 with an image recorded thereon is transported with a paper ejection roller unit 8 to a receiving plate 9 from which the recording paper 1 already recorded can be taken out after opening as shown in the figure a hinge coupled cover 10. The paper feeder roller 6, platen 7, and paper ejection roller unit 8 are driven by mechanisms not shown in the figure.

The head unit 2 is mounted on a carriage 11 which is supported with a pair of parallel guide rods 12*a* and 12*b* so that the head unit 2 can be moved right and left as seen in the figure as shown by a double-headed arrow A. The guide rods 12*a* and 12*b* are fixedly supported on a chassis plate 13. The support mechanism is shown omitted in the figure. A pair of pulleys 14*a* and 14*b* rotatively supported by the chassis plate 13 on suitable positions have a closed belt 15 associated therewith and mounted therebetween, and the carriage 11 is fixed on part of the belt 15. One of the pulleys 14*a* is driven by a motor 16 so that the belt 15 is moved to thereby move the carriage 11 right and left along the guide rods 12*a* and 12*b*. Each time the head unit 2 completes a movement corresponding to a single scanning, the platen 7 is rotated in the direction of an arrow B by a predetermined angle, while the recording paper 1 is advanced in the direction of an arrow C by one line. A linear encoder 17 having timing slits along the path of movement of the carriage 11, is fixedly mounted on the chassis plate 13. During the movement of the carriage 11, the timings of jetting ink for respective heads 20 are controlled by timing signals obtained by detecting (for example, by using optical means such as photocouplers) the timing slits of the encoder 17.

Next, with reference to FIG. 2, a relation between a drive voltage applied to each head of the head unit 2 and a recording dot diameter obtained on the recording paper 1, will be described.

Figure 2:
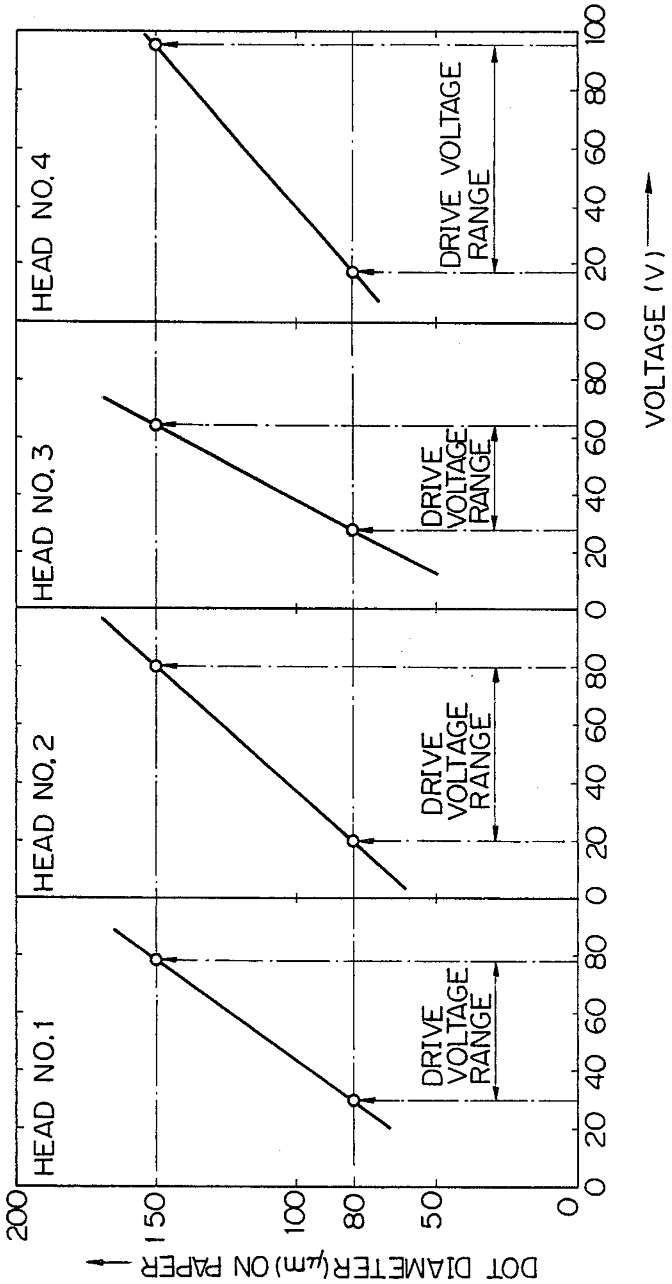
FIG. 2 is a graph for illustrating settings of various drive voltage ranges for the respective electromagnetic conversion elements.

FIG. 2 shows such relations for four heads (No. 1 to No. 4) which are selected arbitrarily for the purpose of illustration, wherein head No. 1 to head No. 4 are respectively related to Y(yellow), M(magenta), C(cyanic) and BK(black). Assuming here that the diameter of a dot recorded on a recording paper varies, for example, linearly with the drive voltage as shown in FIG. 2, it is seen from the figure that the diameter of an ink dot for each head does not necessarily become the same dimension when the same drive voltage is applied thereto, due to the difference in nature of each head. If the desired range of dot diameters on the recording paper is to be within for example 80 to 150 μm, the corresponding drive voltage range, which is different for each head, is shown in Table 1 in connection with its minimum and maximum drive voltage values obtained from the results of experiments.

TABLE 1

| HEAD NUMBER | MINIMUM DRIVE VOLTAGE | MAXIMUM DRIVE VOLTAGE |
|---|---|---|
| No. 1 | 30 V | 78 V |
| No. 2 | 20 V | 80 V |
| No. 3 | 28 V | 64 V |
| No. 4 | 17 V | 96 V |

According to the embodiment of the invention, as pointed out above, the range of voltages for driving each electromechanical conversion element is set such that the variation ranges of dot diameters, formed on a recording medium with recording liquid particles jetted out of each liquid emission nozzle, become substantially same with each other.

Further, in order to obtain a gray scale expression generated from the change of dot diameters on a recording paper by changing the drive voltage for a head, the drive voltage may be varied, for example, stepwise by the same amount of each step, within the above mentioned drive voltage range. For example, in the case of 16-step gray scale expression, the above drive voltage range is equally divided into 15 portions, and the resultant voltage step is used for the driving. Thus, the dot diameter on a recording paper is stepwise changed by the same amount, and the density on the recording paper is accordingly stepwise changed in the same way. Table 2 shows the magnitudes of the voltage steps which are used for stepwise changing the drive voltages for respective drive voltage ranges shown in Table 1. By setting as above, the dot diameter on a recording paper for each head may be made generally equal to each other in each gray scale step.

TABLE 2

| HEAD NUMBER | VOLTAGE STEP AMOUNT |
|---|---|
| No. 1 | 3.20 V |
| No. 2 | 4.00 V |
| No. 3 | 2.40 V |
| No. 4 | 5.27 V |

Figure 3:
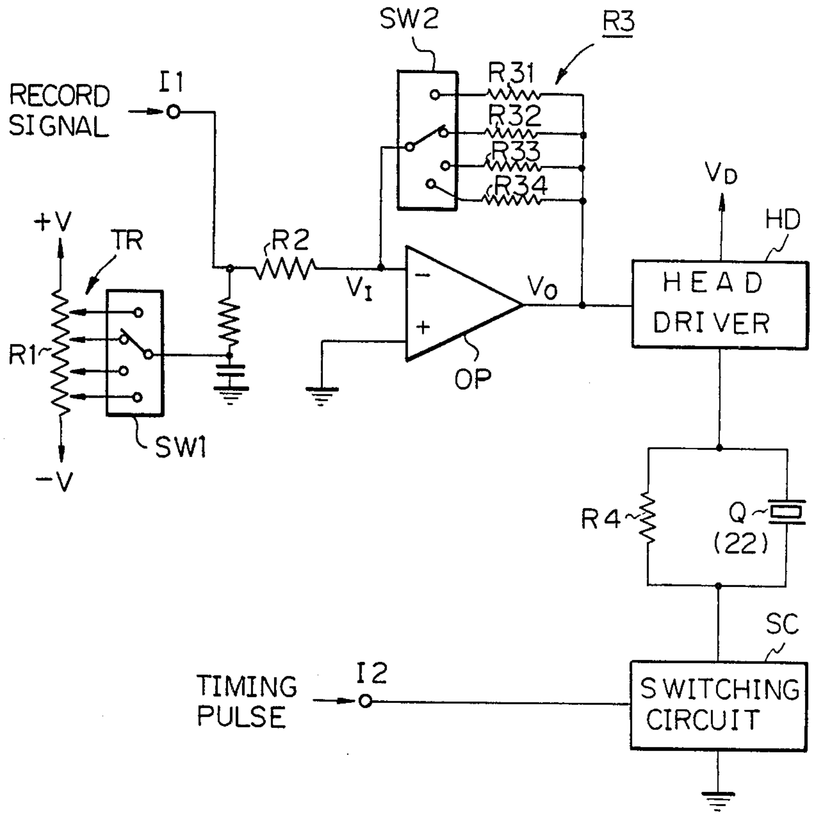
FIG. 3 is a circuit diagram including blocks showing a part of an electromechanical conversion element drive circuit.

FIG. 3 shows an example of a drive circuit provided for each head for independently operating each head of a multihead, which is assembled in a liquid emission recording apparatus and the drive voltage range for each head of which has been decided as described previously. In the figure, I1 designates an input terminal for a recording signal (density signal) D/A converter, SW1 denotes a switch for changing over plural taps TR mounted with respect to a divider resistor R1 connected between power sources +V and −V, OP designates an operational amplifier, R2 denotes the input resistor of the operational amplifier OP, and R3 denotes the feedback resistor thereof, the feedback resistor R3 including a plurality of resistors, different in value and changeable by a changeover switch SW2, such as R31 to R34. VD designates a drive voltage source, HD designates a head driver for driving the above mentioned electromechanical conversion element Q (corresponding to that designated by 22 in FIG. 1A), R4 designates a discharge resistor associated with the piezoelectric element Q, SC designates a switching circuit, and I2 designates an input terminal for a timing pulse (obtained from the encoder 17 in FIG. 1A).

With the circuit constructed as above, the level and gain settings are performed as follows. First, in the level setting, a connection state of the switch SW1 to the taps TR is decided in accordance with a voltage which generates a minimum dot diameter (for example, 80 μm) for a head in association with the corresponding drive circuit. More in particular, the input level for the non-inverting input terminal of the operational amplifier OP is set, so that the minimum drive voltage corresponding to the predetermined minimum dot diameter can be set. Next, in the gain setting, in order to attain a slope of the characteristic curve of FIG. 2, which illustrates a relation between the dot diameter on a recording paper and the drive voltage range, a connection state of the switch SW2 to the resistors R31 to R34 of the resistor R3 is decided. Since the relation between the input voltage Vi of the operation amplifier OP and the output voltage Vo is given by $$Vo = -R3/R2 \cdot Vi,$$

it is possible to adjust the gain of the operational amplifier OP by setting the value of R3. Thus, the voltage step amount shown in Table 2 can be controlled in accordance with Vo, and the drive voltage corresponding to the maximum dot diameter (for example 150 μm) can be set in accordance with a predetermined number of steps of gray scale. It is natural that such settings are independently carried out for each drive circuit for the corresponding head.

With the drive circuit constructed as in the above, a timing pulse applied to the input terminal I2 renders, as well known in the art, the switching circuit actuate, and in turn the head driver HD drives the electromechanical conversion element Q, with a drive voltage level corresponding to the output level from the operational amplifier OP. As a result, a certain amount of liquid particles are jetted out of the emission nozzle of each head to perform a required recording on a recording paper.

Although the feedback resistor R3 has been changed over in FIG. 3, instead, the resistor R3 is made fixed and the input resistor R2 may be changed over between plural resistors different in value. Further, the combination of the resistor R1, the taps TR, and the switch SW a may be replaced with a variable resistor.

According to the embodiment described above, it is possible to obtain a high fidelity image in which the recording density variation range on a recording medium for each head composing a multihead is made uniform in a simple manner and with a low cost, and the color of the recorded image is improved.

What I claimed is:

1. A multihead liquid emission recording apparatus comprising:

a plurality of liquid emission nozzles;

a plurality of electromechanical conversion elements provided in said liquid emission nozzles for emitting recording liquid particles from said nozzles in response to a drive signal; and a drive circuit for supplying each of said electromechanical conversion elements with a drive signal corresponding to its respective recording signal, said drive circuit including setting means provided for each of said nozzles, respectively, for setting the level of the drive signals therefor such that the diameters of dots formed on a recording medium by recording liquid particles emitted from different said nozzles vary within a predetermined range that is substantially the same for each said nozzle.

2. An apparatus as set forth in claim 1, wherein said drive circuit includes a plurality of said setting means.

3. An apparatus as set forth in claim 1 further comprising:

recording liquid supplying means for respectively supplying different recording liquids to said plurality of nozzles.

4. An apparatus as set forth in claim 3, wherein said recording liquids include colored inks different in color from each other.

5. A multihead liquid emission recording apparatus comprising:

a plurality of liquid emission nozzles;

a plurality of electromechanical conversion elements at least one of which is provided for each of said plurality of liquid emission nozzles for jetting a recording liquid particle from said nozzle in response to a drive signal; and drive circuit means for supplying each of said electromechanical conversion elements with a drive signal corresponding to its respective recording signal, wherein the level of the drive signal for each of said electromechanical conversion elements varies within a predetermined range for each said nozzle such that the diameters of dots formed on a recording medium by recording liquid particles jetted from different said nozzles vary within a predetermined range that is substantially the same for each different said nozzle, wherein said drive circuit means includes a plurality of drive circuits for supplying drive signals to said plurality of electromechanical conversion elements and each of said drive circuits includes adjustment means for setting the range of each of the drive signals.

6. An apparatus as set forth in claim 5, wherein each of said drive circuits comprises:

an operational amplifier having at least one input for receiving a recording signal and one output; and a driver for driving, in accordance with a drive signal corresponding to the output from said operational amplifier, each of said electromechanical conversion elements:

wherein said adjustment means can adjust the input level and gain for said operational amplifier.

7. An apparatus as set forth in claim 6, wherein each of said electromechanical conversion elements includes a piezoelectric element and each of said drive circuits supplies a voltage to said piezoelectric element as the drive signal.

8. An apparatus as set forth in claim 5, wherein each of said electromechanical conversion elements includes a piezoelectric element and each of said drive circuits supplies a voltage to said piezoelectric element as the drive signal.

9. A multihead liquid emission recording apparatus comprising:

a plurality of liquid emission nozzles;

a plurality of electromechanical conversion elements at least one of which is provided for each of said plurality of liquid emission nozzles for jetting a recording liquid particle from said nozzle in response to a drive signal;

drive circuit means including a plurality of drive circuits for supplying respective said electromechanical conversion elements with a drive signal corresponding to its respective recording signal, wherein (i) the level of the drive signal for each of said electromechanical conversion elements varies within a predetermined range for each said nozzle such that the diameters of dots formed on a recording medium by recording liquid particles jetted from different said nozzles are substantially the same for corresponding steps of the drive signals, and (ii) each of said drive circuits includes an operational amplifier having an input for receiving the recording signal and one output providing the drive signal for driving each of said electromechanical conversion elements; and adjustment means for setting the level of the drive signals within the predetermined range, said adjustment means including a first resistor network and switch means connected to said input of said operational amplifier for setting the minimum dot diameter formed on the recording medium by said nozzles and a second resistor network and switch means connected between said output and said input of said operational amplifier for setting the maximum dot diameter formed on the recording medium by said nozzles.

10. An apparatus as set forth in claim 1, wherein said drive circuit is capable of varying the level of the respective drive signal for each said electromechanical conversion element continuously within the respective predetermined range therefor.

* * * * *

UNITED STATES PATENT AND TRADEMARK OFFICE

CERTIFICATE OF CORRECTION

PATENT NO. : 4,769,653

DATED : September 6, 1988

INVENTOR(S) : JUNJI SHIMODA

It is certified that error appears in the above-identified patent and that said Letters Patent is hereby corrected as shown below:

AT [30] IN FOREIGN APPLICATION PRIORITY DATA

"Dec. 9, 1983 [JP] Japan ..... 55-232537" should read
--Dec. 9, 1983 [JP] Japan ..... 58-232537--.

AT [57] IN THE ABSTRACT

Line 10, "element" should read --elements--.

COLUMN 2

Line 7, "nozzles;" should read --nozzle;--.
Line 15, "each said" should read --each of said--.
Line 16, "same." should read --the same.--.
Line 17, "caes," should read --case,--.
Line 23, "same" should read --the same--.
Line 52, "FIG. 1, reference number 1A" should read --FIG. 1A, reference number 1--.
Line 58, "are" should read --is--.
Line 64, "ink" should read --inks--.

COLUMN 3

Line 18, "tublar" should read --tubular--.
Line 30, "a single" should read --one--.
Line 34, "FIG. 1, the recording paper 1A" should read --FIG. 1A, the recording paper 1--.

UNITED STATES PATENT AND TRADEMARK OFFICE
CERTIFICATE OF CORRECTION

PATENT NO. : 4,769,653
DATED : September 6, 1988
INVENTOR(S) : JUNJI SHIMODA

It is certified that error appears in the above-identified patent and that said Letters Patent is hereby corrected as shown below:

COLUMN 4

Line 38, "same" should read --the same--.
Line 43, "of" should read --for--.

COLUMN 5

Line 3, "D/A converter," should read --D/A converted,--.
Line 35, "operation" should read --operational--.
Line 63, "SW" should read --SW1--.
Line 64, "a" (first occurrence) should be deleted.

COLUMN 6

Line 3, "claimed" should read --claim--.

Signed and Sealed this

Fourteenth Day of March, 1989

*Attest:*

DONALD J. QUIGG

*Attesting Officer* *Commissioner of Patents and Trademarks*